US009065605B2

(12) United States Patent
Piazzi et al.

(10) Patent No.: US 9,065,605 B2
(45) Date of Patent: Jun. 23, 2015

(54) METHODS AND SYSTEMS FOR CREST FACTOR REDUCTION IN MULTI-CARRIER MULTI-CHANNEL ARCHITECTURES

(71) Applicant: FutureWei Technologies, Inc., Plano, TX (US)

(72) Inventors: Leonard Piazzi, Denville, NJ (US); Zhengxiang Ma, Summit, NJ (US); Jian Wang, Bridgewater, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 65 days.

(21) Appl. No.: 13/802,028

(22) Filed: Mar. 13, 2013

(65) Prior Publication Data

US 2014/0269984 A1    Sep. 18, 2014

(51) Int. Cl.
*H04L 1/00*    (2006.01)

(52) U.S. Cl.
CPC .................................. *H04L 1/0033* (2013.01)

(58) Field of Classification Search
CPC .......................... H04B 7/0671; H04L 27/2624
USPC .......................................................... 375/224
See application file for complete search history.

(56) References Cited

U.S. PATENT DOCUMENTS

| 8,599,961 | B2 * | 12/2013 | Schmidt et al. | 375/296 |
| 8,619,903 | B2 * | 12/2013 | Schmidt et al. | 375/296 |
| 2006/0029158 | A1 * | 2/2006 | Lipka et al. | 375/300 |
| 2008/0043616 | A1 * | 2/2008 | Clausen et al. | 370/210 |
| 2010/0158166 | A1 * | 6/2010 | Gandhi | 375/345 |
| 2010/0329401 | A1 * | 12/2010 | Terry | 375/346 |
| 2011/0182339 | A1 * | 7/2011 | Kang et al. | 375/224 |
| 2012/0093209 | A1 * | 4/2012 | Schmidt et al. | 375/224 |
| 2012/0093210 | A1 * | 4/2012 | Schmidt et al. | 375/224 |
| 2012/0258676 | A1 * | 10/2012 | Smart | 455/127.1 |
| 2012/0300824 | A1 * | 11/2012 | Maehata et al. | 375/224 |
| 2013/0163512 | A1 * | 6/2013 | Rexberg et al. | 370/328 |

OTHER PUBLICATIONS

Lashkarian et al., "Crest Factor Reduction in Multi-Carrier WCDMA Transmitters," PIMRC 2005. IEEE 16th International Symposium, vol. 1, No., pp. 321-325, Sep. 11-14, 2005.*
Zhao, Chunming, "Distortion-Based Crest Factor Reduction Algorithms in Multi-Carrier Transmission Systems," Dissertation Presented to Georgia Institute of Technology, Dec. 2007.*

* cited by examiner

*Primary Examiner* — Daniel Washburn
*Assistant Examiner* — Berhanu Tadese
(74) *Attorney, Agent, or Firm* — Slater & Matsil, L.L.P.

(57) ABSTRACT

Crest factor reduction (CFR) can be performed on the various carriers of a multi-carrier multi-channel signal prior to modulation and/or beamforming operations in order to improve signal-to-noise ratios (SNRs) in the resulting wireless communication. More specifically, clipping noise is introduced into each of the individual carrier signals prior to application of the beamforming weight vectors, as well as prior to carrier modulation, thereby causing the beamforming weight vectors to be applied to both the signal and the clipping noise. As a result, variations between the signal antenna pattern and the clipping noise antenna pattern are reduced, which mitigates and/or reduces low SNR spatial locations in which the signal would have been drowned out by the clipping noise under conventional CFR.

13 Claims, 12 Drawing Sheets

US 9,065,605 B2

METHODS AND SYSTEMS FOR CREST FACTOR REDUCTION IN MULTI-CARRIER MULTI-CHANNEL ARCHITECTURES

TECHNICAL FIELD

The present invention relates generally to wireless communications, and, in particular embodiments, to a system and method for crest factor reduction in multi-carrier multi-channel architectures.

BACKGROUND

Power Amplifiers are used to amplify signals prior to transmission in an efficient, yet linear, manner such that substantial gain (i.e., amplification) is achieved without significantly altering frequency characteristics of the resulting signal. Power amplifier performance is often heavily affected by the signal's peak-to-average ratio (PAR) or crest factor, which is peak amplitude of the waveform divided by the root mean squared (RMS) of the waveform. Hence, power amplifiers may amplify signals having low PAR characteristics more efficiently than signals having high PAR characteristics.

SUMMARY OF THE INVENTION

Technical advantages are generally achieved, by aspects of this disclosure directed towards systems and methods for crest factor reduction in multi-carrier multi-channel architectures.

In accordance with an embodiment, a method for reducing a peak-to-average (PAR) ratio of a multi-carrier wireless signal includes generating a first carrier signal and a second carrier signal, and introducing clipping noise into the first carrier signal and the second carrier signal prior to modulating the carrier signals. An apparatus for performing this method is also provided.

In accordance with another embodiment, an apparatus for reducing PAR ratios in a multi-carrier wireless signal included a modulating module, a first carrier generating module configured to generate a first carrier signal, a second carrier generating module configured to generate a second carrier signal, a first noise clipping module, and a second noise clipping module. The first noise clipping module is positioned between the first carrier generating module and the modulating module and is configured to receive a first carrier signal, introduce a first clip noise into the first carrier signal to obtain the first clipped carrier signal, and forward the first clipped carrier signal to the modulating module. The second noise clipping module is positioned in between the second carrier generating module and the modulating module and is configured to receive the second carrier signal, introduce a second clip noise into the second carrier signal to obtain a second clipped carrier signal, and forward the second clipped carrier signal to the modulating module. The modulating module is configured to combine the first clipped carrier signal with the second clipped carrier signal to obtain a modulated carrier signal. The modules may be constructed using field programmable gate arrays, application-specific integrated circuits (ASICs), or other components.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments of this disclosure and are not necessarily drawn to scale.

DETAILED DESCRIPTION OF ILLUSTRATIVE EMBODIMENTS

The making and using of the embodiments of this disclosure are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Crest factor reduction (CFR) is a signal processing technique that regulates PAR by introducing clipping noise into a signal at certain frequencies to eliminate or cap peaks in the signal. Although relatively effective at reducing PAR for single carrier network architectures, conventional CFR processing techniques have significant performance limitations in multi-carrier multi-channel network networks, where two or more carriers are used to communicate data over two or more transmit paths (TRx paths). More specifically, conventional CFR processing techniques perform CFR on each TRx path, which (for reasons explained in greater detail below) tends to produce low signal to noise ratios (SNRs) in various spatial locations of the antenna pattern. To with, the amplitude of the clip noise approaches the amplitude of the signal for various phases of the antenna's radiation pattern, which leads to poor signal quality in corresponding zones of the cell, leading, for example, to an unduly high incidence of dropped calls, etc. As such, improved CFR processing techniques and architectures are desired for multi-carrier multi-channel networks.

Aspects of this disclosure provide a new CFR multi-channel architecture that introduces clipping noise into each carrier prior to digital beam forming and modulation, thereby achieving improved performance for multi-carrier multi-TRx networks. In one embodiment, the amount of clip noise introduced into the respective carrier is determined in accordance with projected or estimated transmission signals. For instance, transmission signals projected to result from the combination of two or more carrier signals may be estimated prior to combining the carrier signals. Thereafter, the projected transmission signal having the highest crest factor may be used to determine a clip noise signal needed for clipping the projected transmission signals. The clip noise signal may then be analyzed to identify component clipping noise signals for introducing into each of the carrier signals. These and other aspects are described in greater detail below.

Figure 1:
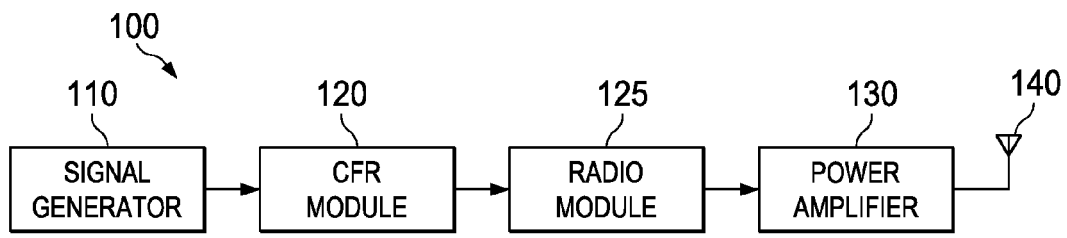
FIG. 1 illustrates a noise clipping circuit.
Figure 2A:
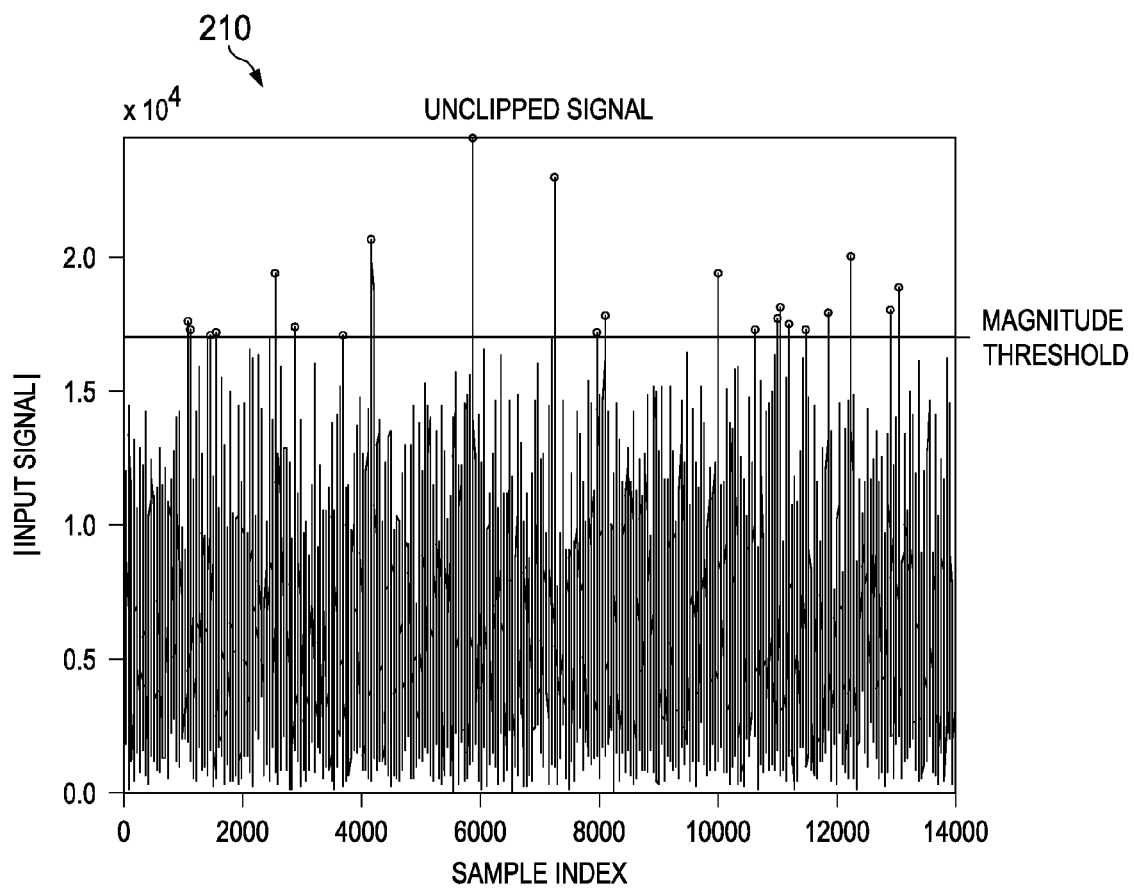
FIG. 2(a) illustrates a time domain plot of an unclipped signal.
Figure 2B:
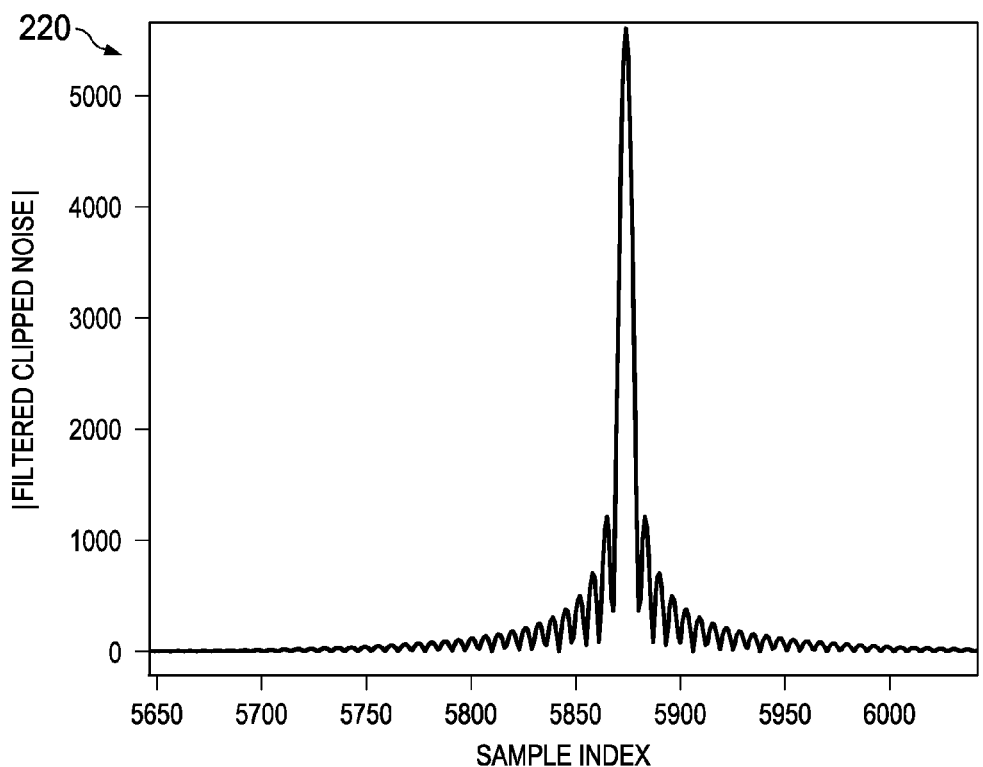
FIG. 2(b) illustrates a time domain plot of a clipping noise signal.
Figure 2C:
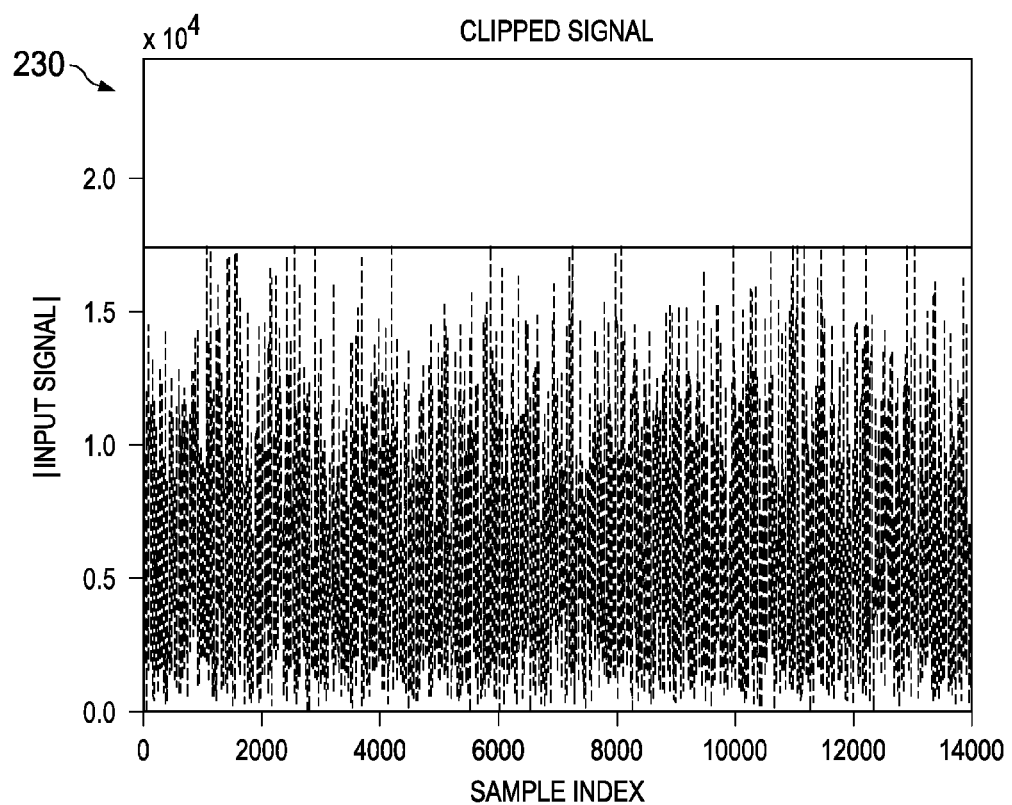
FIG. 2(c) illustrates a time domain plot of a clipped signal and an unclipped signal.
Figure 2D:
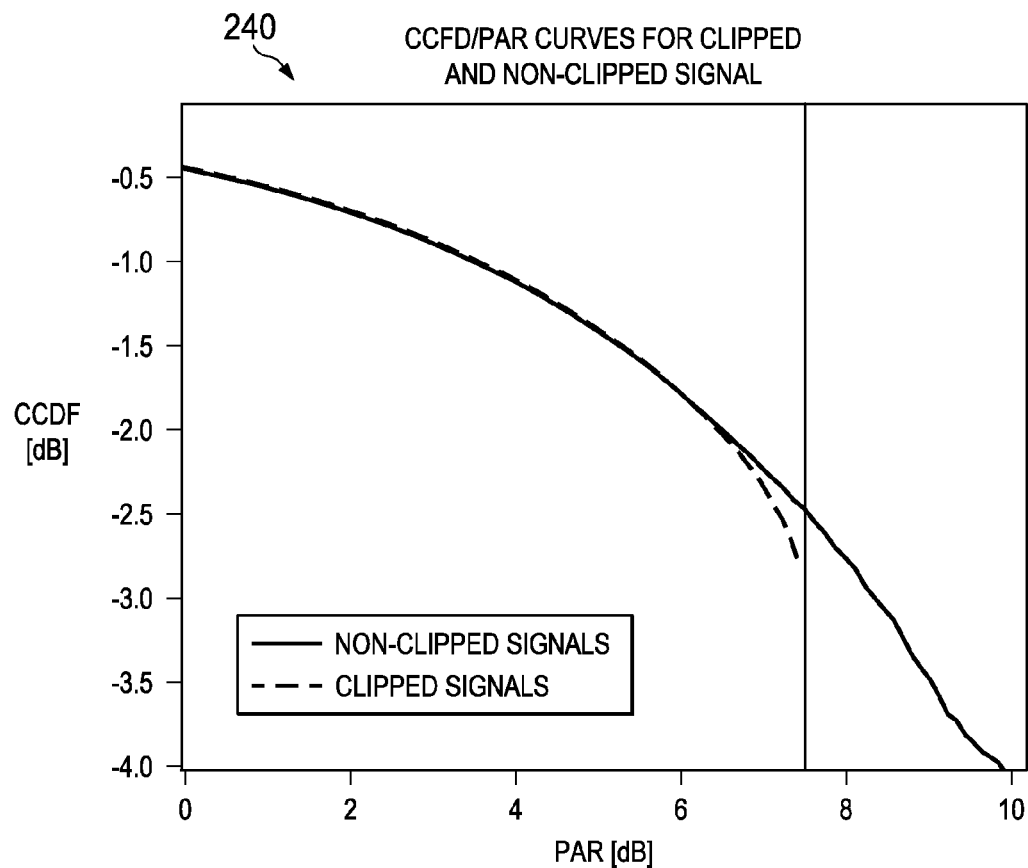
FIG. 2(d) illustrates a chart of a complementary cumulative distribution function (CCDF) of the clipped and unclipped signals.

FIG. 1 illustrates a noise clipping circuit 100 comprising a signal generator 110, a CFR module 120, a radio module 125, a power amplifier 130, and a transmit antenna 140. The signal generator 110 is configured to generate a digital signal, which is processed by the CFR module 120 before being converted into an RF signal by the radio module 125. The RF signal is then amplified by the power amplifier 130 and transmitted over the transmit antenna 140. FIG. 2(a) illustrates a diagram 210 of a time domain plot of an unclipped signal, as may be generated by the signal generator 110. Notably, the unclipped signal has peaks (i.e., portions of the signal exceeding the magnitude threshold), which are circled in the diagram 210. FIG. 2(b) illustrates a diagram 220 of a clipping noise signal, as may be generated by the CFR module 120. Notably, the noise signal depicted in the diagram 220 is introduced into the unclipped signal depicted in the diagram 210 to clip or otherwise eliminate many or all of the signal peaks. FIG. 2(c) illustrates a diagram 230 of a clipped signal, such as signal 210 of FIG. 2(a), following introduction of the noise signal 220 depicted in FIG. 2(b). As shown, most of the peaks in the unclipped signal 210 have been removed in the clipped signal. FIG. 2(d) illustrates a chart 240 of a complementary cumulative distribution function (CCDF) of the clipped and unclipped signals. As shown, the clipped signal has a far lower probability of exceeding the amplitude threshold than the unclipped signal, and consequently will allow the power amplifier 130 to operate more efficiently and/or in a more linear fashion.

Figure 3:
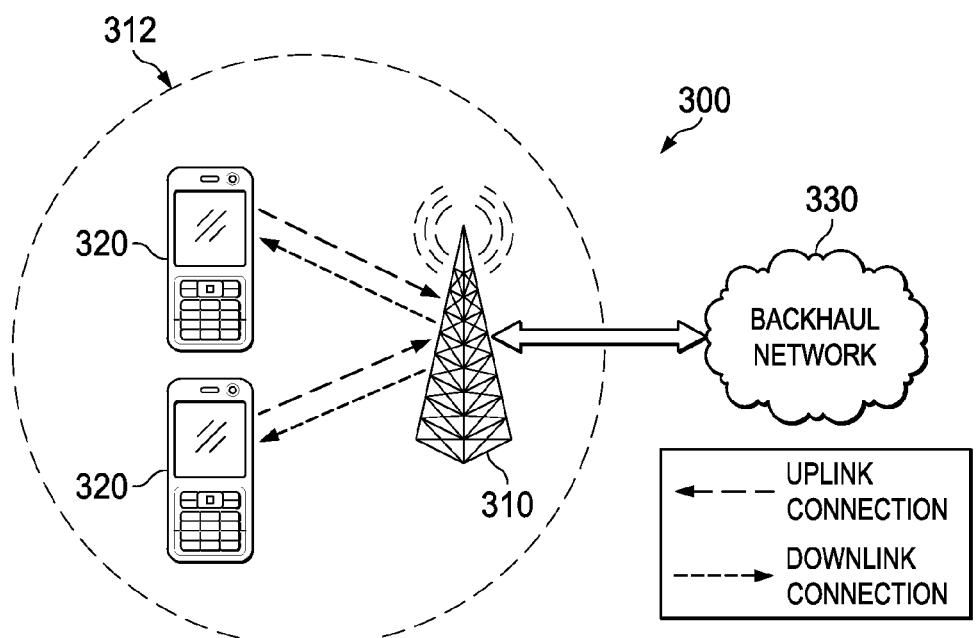
FIG. 3 illustrates a diagram of a communications network.

FIG. 3 illustrates a network 300 for communicating data. The network 300 comprises an access point (AP) 310 having a coverage area 312, a plurality of user equipments (UEs) 320, and a backhaul network 330. The AP 310 may comprise any component capable of providing wireless access by, inter alia, establishing uplink (dashed line) and/or downlink (dotted line) connections with the UEs 320, such as a base station, an enhanced base station (eNB), a femtocell, and other wirelessly enabled devices. The UEs 320 may comprise any component capable of establishing a wireless connection with the AP 310. The backhaul network 330 may be any component or collection of components that allow data to be exchanged between the AP 310 and a remote end (not shown). In some embodiments, the network 300 may comprise various other wireless devices, such as relays, femtocells, etc.

Figure 4:
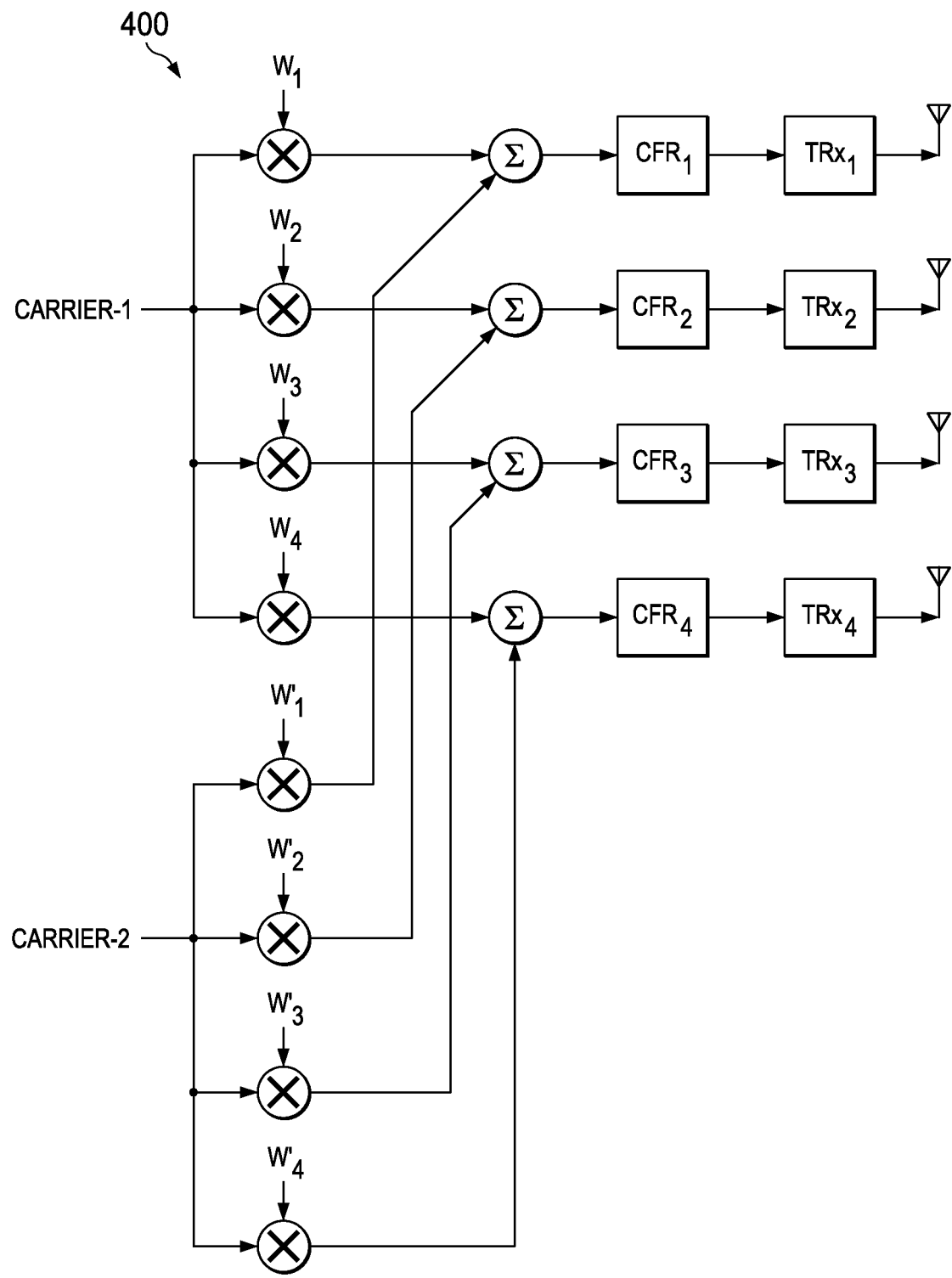
FIG. 4 illustrates a diagram of a conventional multi-carrier multi-channel transmitter.

FIG. 4 illustrates a conventional multi-carrier multi-channel transmitter 400 that includes a first carrier (Carrier-1) and a second carrier (Carrier-2). As shown, both carriers are split into four transmit paths (TRx paths), after which a first set of beamforming weight vectors ($W_1, W_2, W_3, W_4$) are applied to the paths of the Carrier-1 and a second set of beamforming weight vectors ($W_1', W_2', W_3', W_4'$) are applied to the paths of the Carrier-2. Thereafter, the signals traveling over each of the TRx paths are clipped by the CFR modules ($CFR_1, CFR_2, CFR_3, CFR_4$) before being transmitted over the antennas by the transmitter modules ($TRx_1, TRx_2, TRx_3, TRx_4$).

Figure 5:
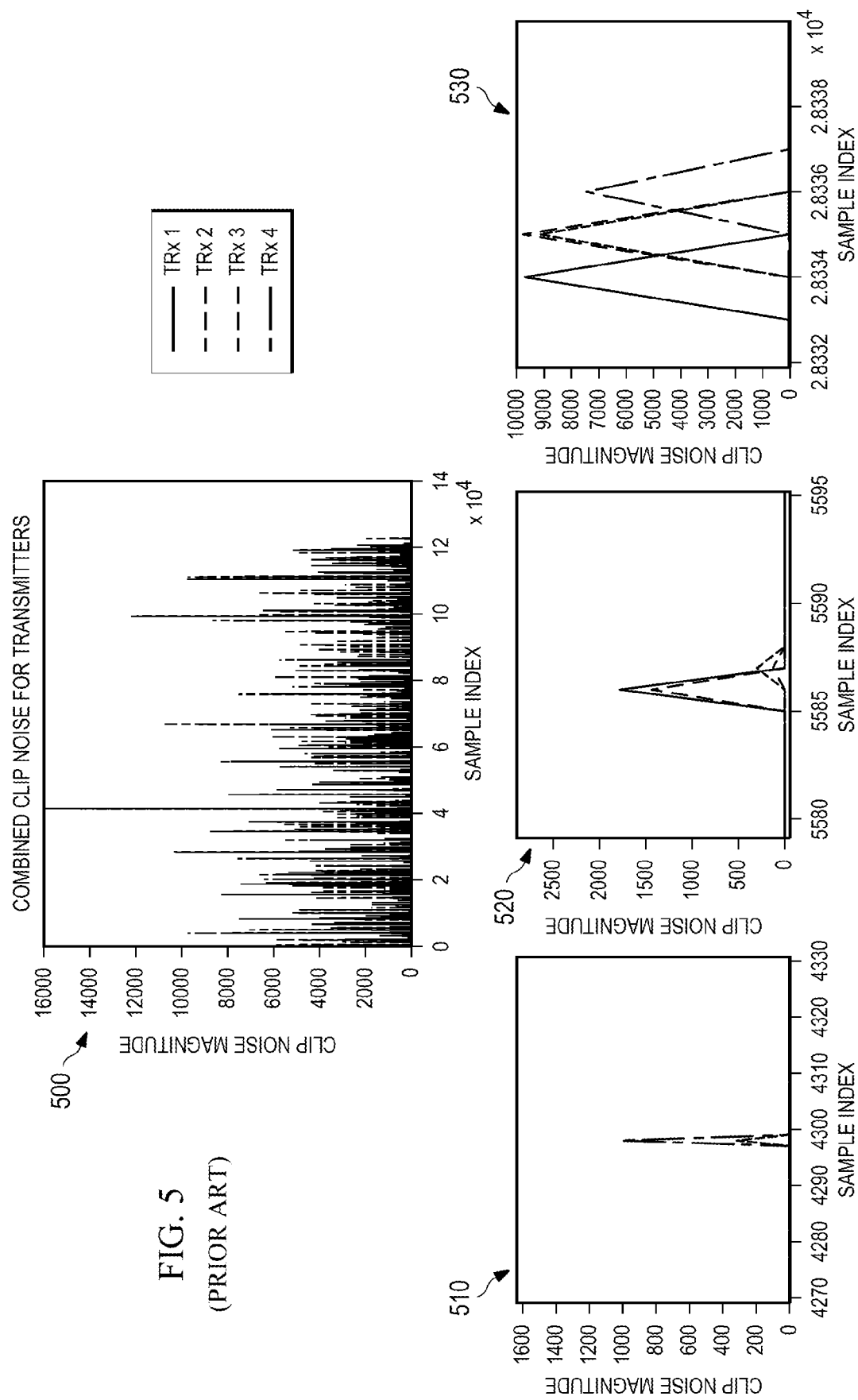
FIG. 5 illustrates a time domain plot of unfiltered clipping noise.

Introducing clipping noise after applying the beamform weighting vectors can cause the noise pattern to vary widely. FIG. 5 illustrates a diagram 500 showing unfiltered clipping noise for the four transmit paths in the multi-carrier multi-channel transmitter 400. Further, and upon examining the specific intervals, it can be seen that clip noise is not present on each TRx path during some instances in time. For instance, clip noise is absent on the TRx1 and TRx2 paths during the interval 510. Additionally, the noise patterns may vary greatly over the sample index. For instance, peak clip noise is much lower during the interval 520 than the interval 530. As a result the clip noise that is presented to the antenna will not have the same antenna element phase relationship as the signal. Consequently, the clip noise antenna pattern may differ from the signal antenna pattern such that clip noise will dominate the signal in certain spatial locations, thereby degrading performance at those respective locations. In other words, the conventional approach of performing CFR on each TRx path may lead to variations between the clip noise antenna pattern and the signal antenna pattern, which may result in degraded SNR performance at some spatial locations (e.g., locations where CFR noise dominates the signal). In contrast, performing CFR on the carrier signals (e.g., prior to application of the beamforming weight vectors) in accordance with aspects of this disclosure may maintain the same or similar antenna patterns for both the clip noise and signal, thereby potentially avoiding degraded SNR performance at the corresponding spatial locations (e.g., locations where CFR noise may have otherwise dominated the signal had conventional per TRx CFR been performed).

Figure 6:
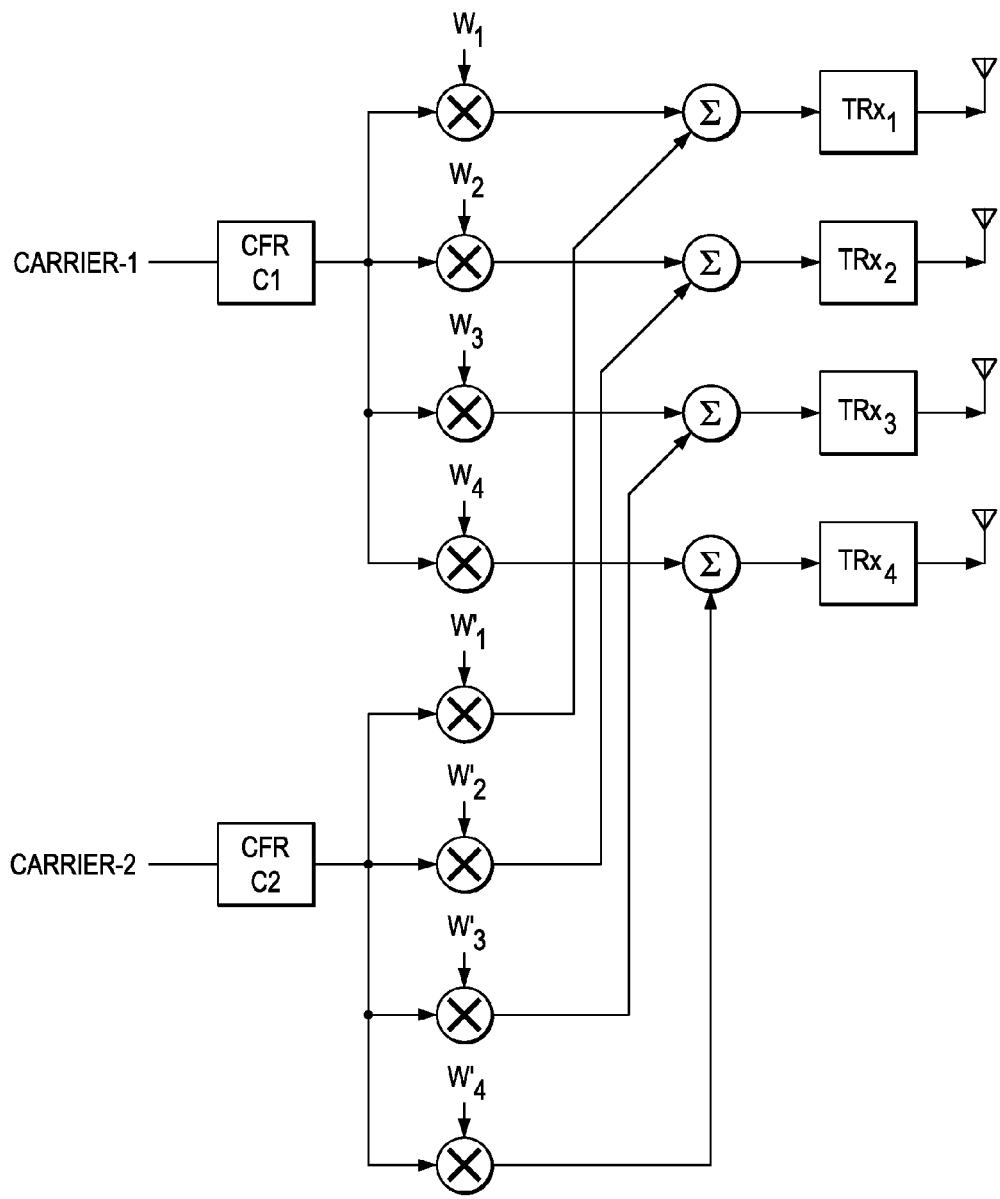
FIG. 6 illustrates a diagram of an embodiment multi-carrier multi-channel transmitter.

An alternative approach is to introduce CFR clipping noise into the carrier signals prior to applying the beamforming weight vectors, which allows the clipping noise to be subject to the same phase/amplitude manipulations as the data signal. FIG. 6 illustrates an embodiment multi-carrier multi-channel transmitter 600 for performing CFR on the carrier signals. As shown, the multi-carrier multi-channel transmitter 600 introduces clipping noise into the Carrier-1 and the Carrier-2 prior to applying the beamforming weight vectors. As a result, the beamforming weight vectors are applied to both the signal and the clipping noise signal, which eliminates the occurrence of low signal-to-clipping-noise ratios radiated over the air.

Figure 7:
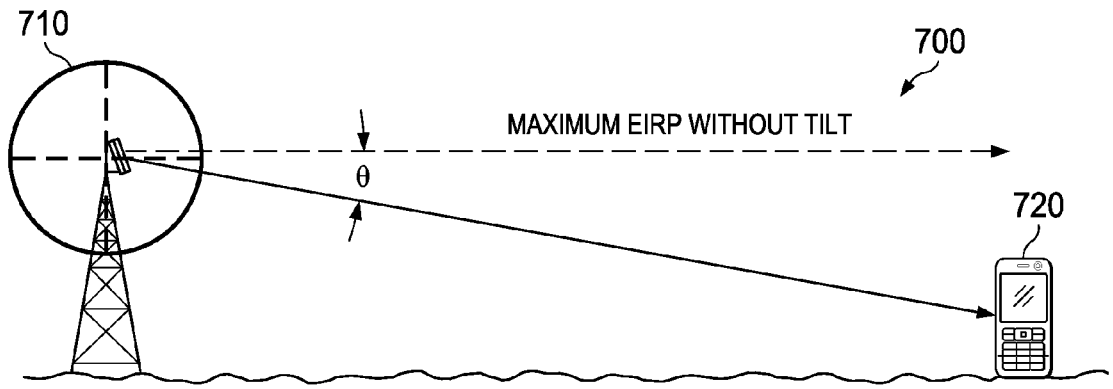
FIG. 7 illustrates a diagram of a cell tower transmitting a signal to a mobile station.
Figure 8:
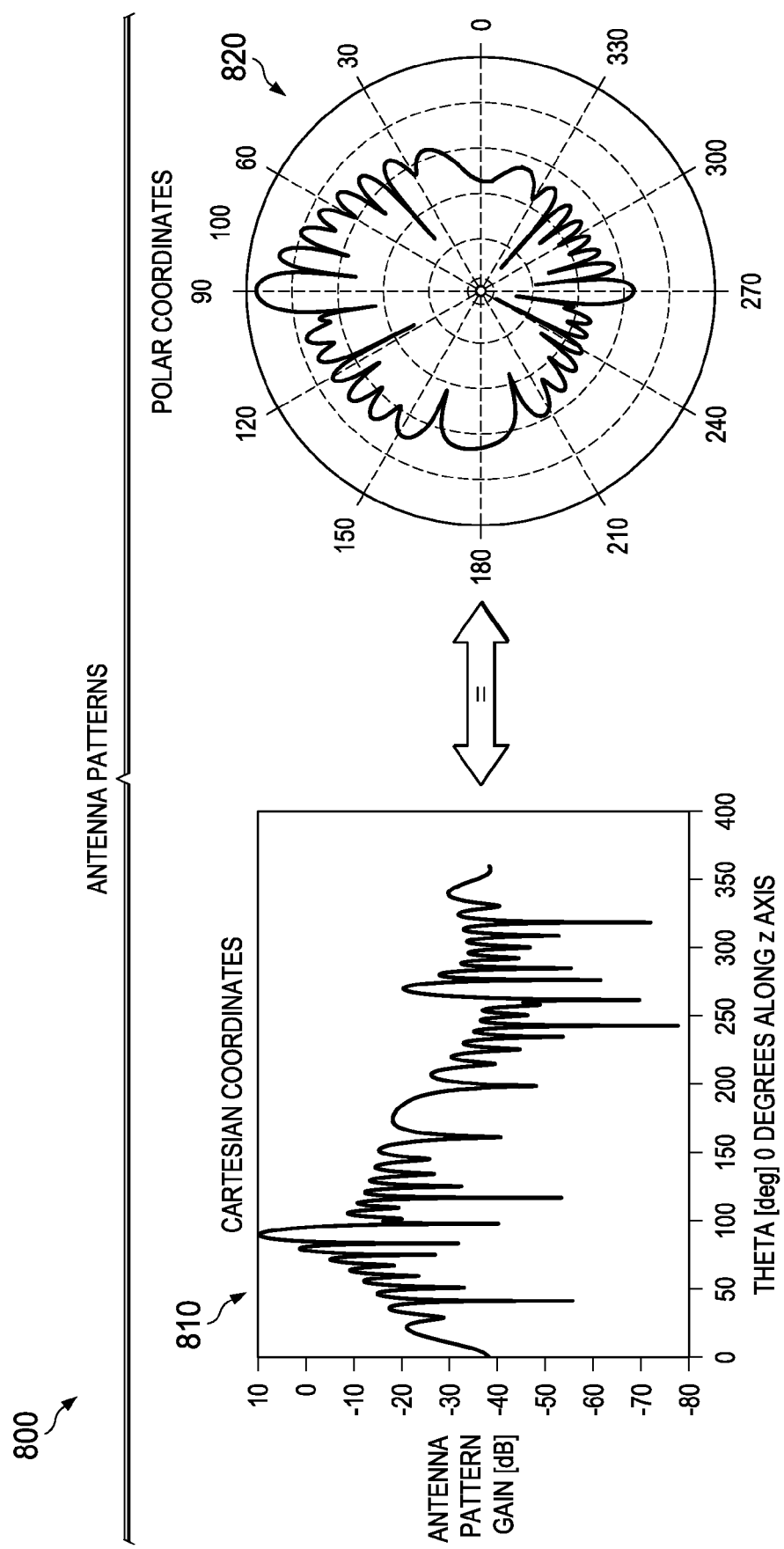
FIG. 8 illustrates a graph of an antenna pattern.

FIG. 7 illustrates a network 700 in which a cell tower 710 is transmitting a signal to a mobile station 720. The cell tower 710 has a maximum Effective Isotropically Radiated Power (EIRP) trajectory as represented by the dashed arrowhead extending horizontally from the antenna of the cell tower 710. Accordingly, the cell tower 710 may tilt (electronically or mechanically) its antenna downward by a tilt angle (A) in order to achieve a higher SNR at the mobile station 720. FIG. 8 shows an antenna pattern graphed in Cartesian coordinates 810 and polar coordinates 820. As shown, some spatial positions (e.g., 240 degrees) show low antenna gain, which results in low reception quality at the corresponding spatial locations. Low reception quality may occur when clipping noise amplitude is comparatively high with respect to signal amplitude at a given spatial location, which causes the signal to be "drowned out" (i.e., overtaken or otherwise diminished) by the clipping noise at that respective location. Aspects of this disclosure address this issue by introducing clipping noise into the carrier signals prior to application of the beamforming vectors, which causes the beamforming weights to be applied to both the signal and the clipping noise. Applying the same beamforming weights to the clipping noise and data signal reduces the likelihood that portions of the antenna pattern will have low signal-to-clip-noise ratios, thereby reducing the number and/or severity of nulls in the antenna pattern.

Figure 9:
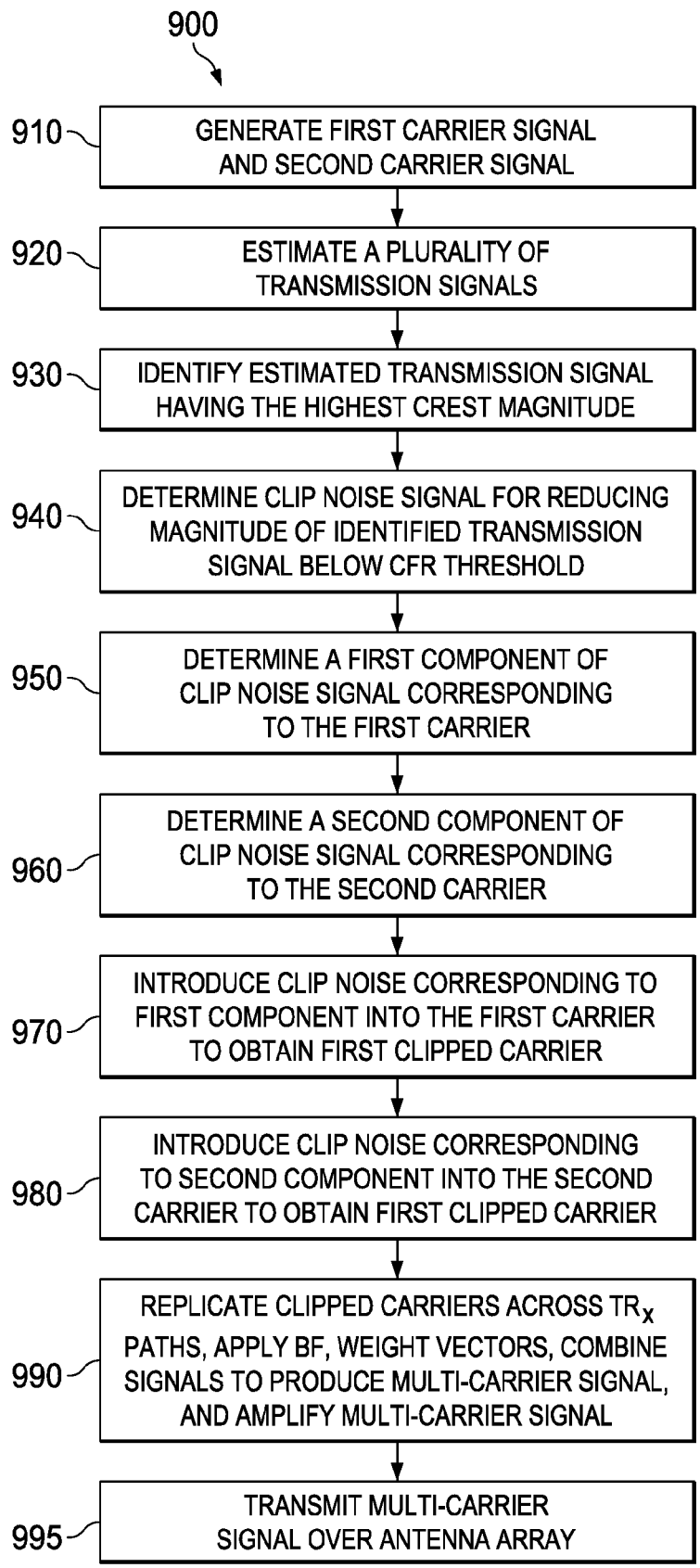
FIG. 9 illustrates a flowchart of a method for performing CFR in a multi-carrier multi-channel network.

FIG. 9 illustrates a method 900 for performing CFR in a multi-carrier multi-channel network, as might be performed by a transmitter in accordance with aspects of this disclosure. The method 900 begins at step 910, where the transmitter generates a first carrier signal and a second carrier signal. Next, the method 900 proceeds to step 920, where the transmitter estimates a plurality of transmission signals. The estimated transmission signals may be projections of signals that would be propagated over the transmit paths once the carrier signals are combined. Subsequently, the method 900 proceeds to step 930, where the transmitter identifies which of the estimated transmission signals will have the highest magnitude, as the clipping noise signal will be based on the highest magnitude transmission signal. Thereafter, the method 900 proceeds to step 940, where the transmitter determines the clipping noise signal required for reducing the magnitude of the identified transmission below a CFR threshold. Next, the method 900 proceeds to steps 950 and 960, where the transmitter determines a first component of the clipping noise signal corresponding to the first carrier and a second component of the clipping noise signal, respectively. Subsequently, the method 900 proceeds to steps 970 and 980, where the transmitter introduces the clipping noise components into the respective carrier signals. Next, the method 900 proceeds to step 990, where the transmitter duplicates the clipped carrier signals across a plurality of TRx paths, applies beamforming vectors to the replicated signals, combines the carrier signals to form multi-carrier signals, and amplifies the multi-carrier signals. Finally, the method 900 proceeds to step 995, where the transmitter transmits the multi-carrier signal over the multiple antenna array, thereby emitting a multi-carrier multi-channel wireless signal.

Figure 10:
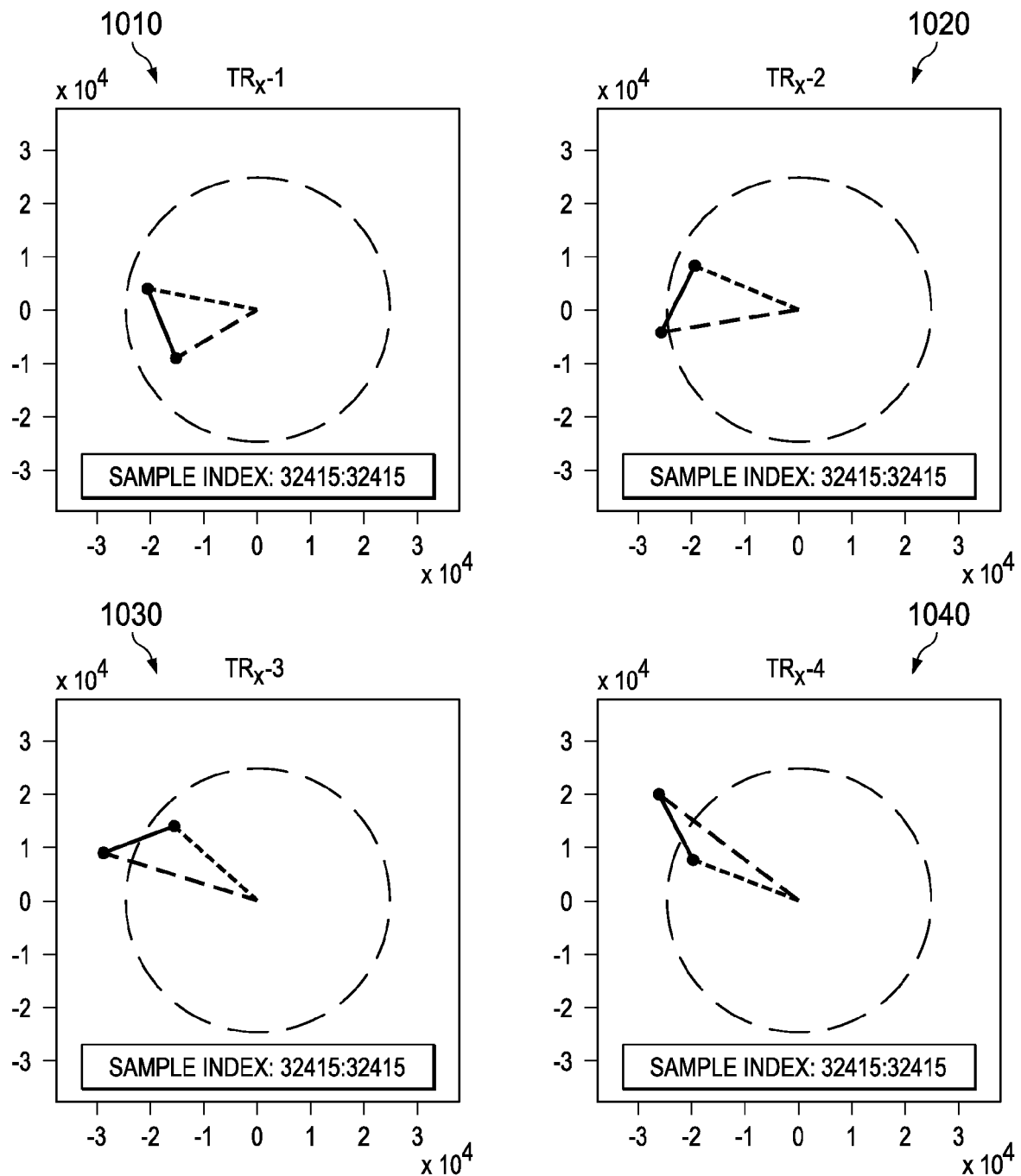
FIG. 10 illustrates graphs of estimated unclipped transmission signals projected to be generated by a multi-carrier multi-channel transmitter.

FIG. 10 illustrates the estimated unclipped transmission signals 1010-1040 for the four transmission paths in the multi-carrier multi-channel transmitter 600 at a given sample index, as may be generated by the step 920 in the method 900. As shown, the signal magnitudes for the estimated unclipped transmission signals 1020, 1030, and 1040 exceed the CFR threshold (designated by the dashed circle), while the signal magnitude for the estimated unclipped transmission signal 1010 does not exceed the CFR threshold. Notably, the estimated unclipped transmission signal 1040 has the highest signal magnitude, and is therefore used to determine the clipping noise signal in the step 940.

Figure 11:
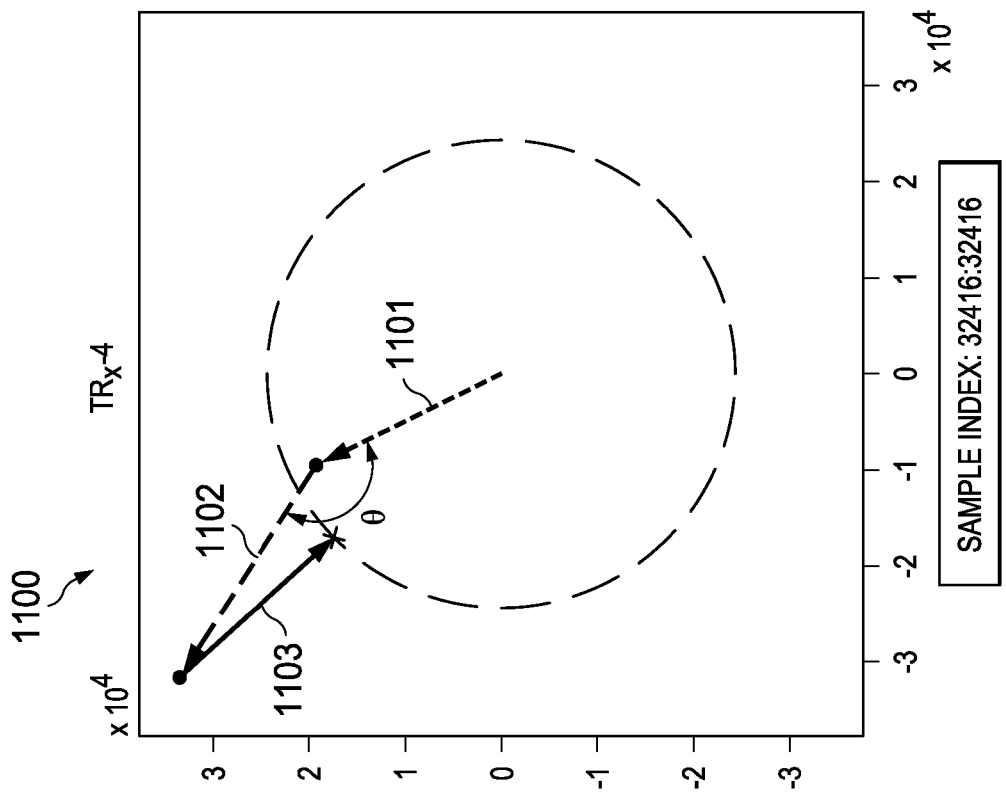
FIG. 11 illustrates a diagram explaining how a clipping noise signal is derived from an estimated transmission signal.

FIG. 11 illustrates a diagram 1100 explaining how the clipping noise signal 1103 is determined in accordance with the estimated unclipped transmission signal 1040, as may be performed during the step 940 in the method 900. As shown, the estimated transmission signal 1040 has two component vectors, namely a first carrier component vector 1101 and a second carrier component vector 1102. The clipping noise vector 1103 is determined by subtracting the CFR threshold magnitude from the summed vectors 1101-1102.

Figure 12:
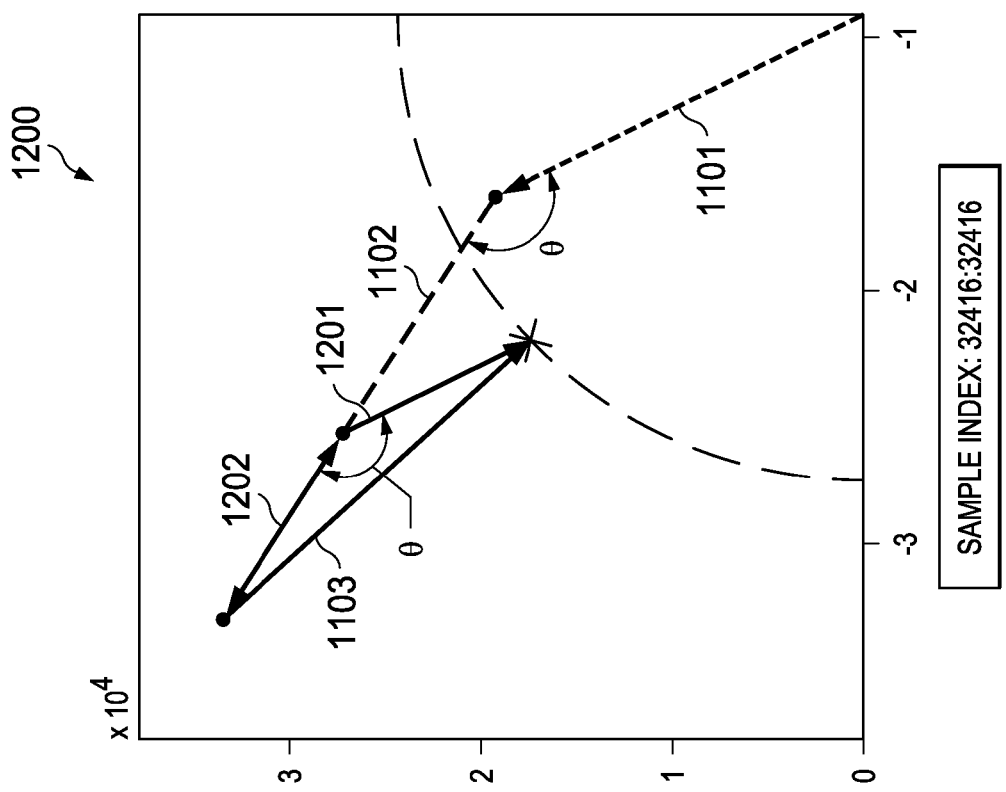
FIG. 12 illustrates a diagram explaining how component clipping noise signals are derived from a clipping noise signal.

FIG. 12 illustrates a diagram 1200 explaining how the component clipping noise signal 1201-1202 are determined from the clipping noise signal 1103, as may be performed during the step 950 in the method 900. As shown, the magnitude of the summed component clipping noise signals 1201-1202 is equivalent to that of the clipping noise signal 1103, with the component clipping noise signal 1201 having the same amplitude phase ratio as the carrier component vector 1101, and the component clipping noise signal 1202 having the same amplitude-to-phase ratio as the carrier component vector 1102. To with, the angle ($\theta$) between the component vectors 1101 and 1102 may the same as the angle ($\theta$) between the component clipping noise signals 1201 and 1202. The component clipping noise signal 1201-1202 may be introduced into the carrier signals to achieve crest factor reduction. In some embodiments, the component clipping noise signal 1201-1202 may be adjusted to account for differences in the BF vectors applied to their respective carriers. Clip noise signals may be chosen to ensure that downstream the peaks are reduced to the desired level. In some embodiments, adjustments are performed carefully to ensure the peaks do not re-grow downstream. Clipping vectors can be determined in a few different ways. For instance, clip noise magnitude may be proportionally distributed to the carriers based on the power of the each carrier at that time, as is demonstrated in FIG. 12. Alternatively, clip noise magnitude may be disproportionally distributed to the carriers such that more clip noise is added to some carriers than others. In any event, it may be beneficial for networks to remain consistent in the manner (e.g., proportional, disproportional, or otherwise) in which clip noise is identified and applied to the carriers.

Figure 13:
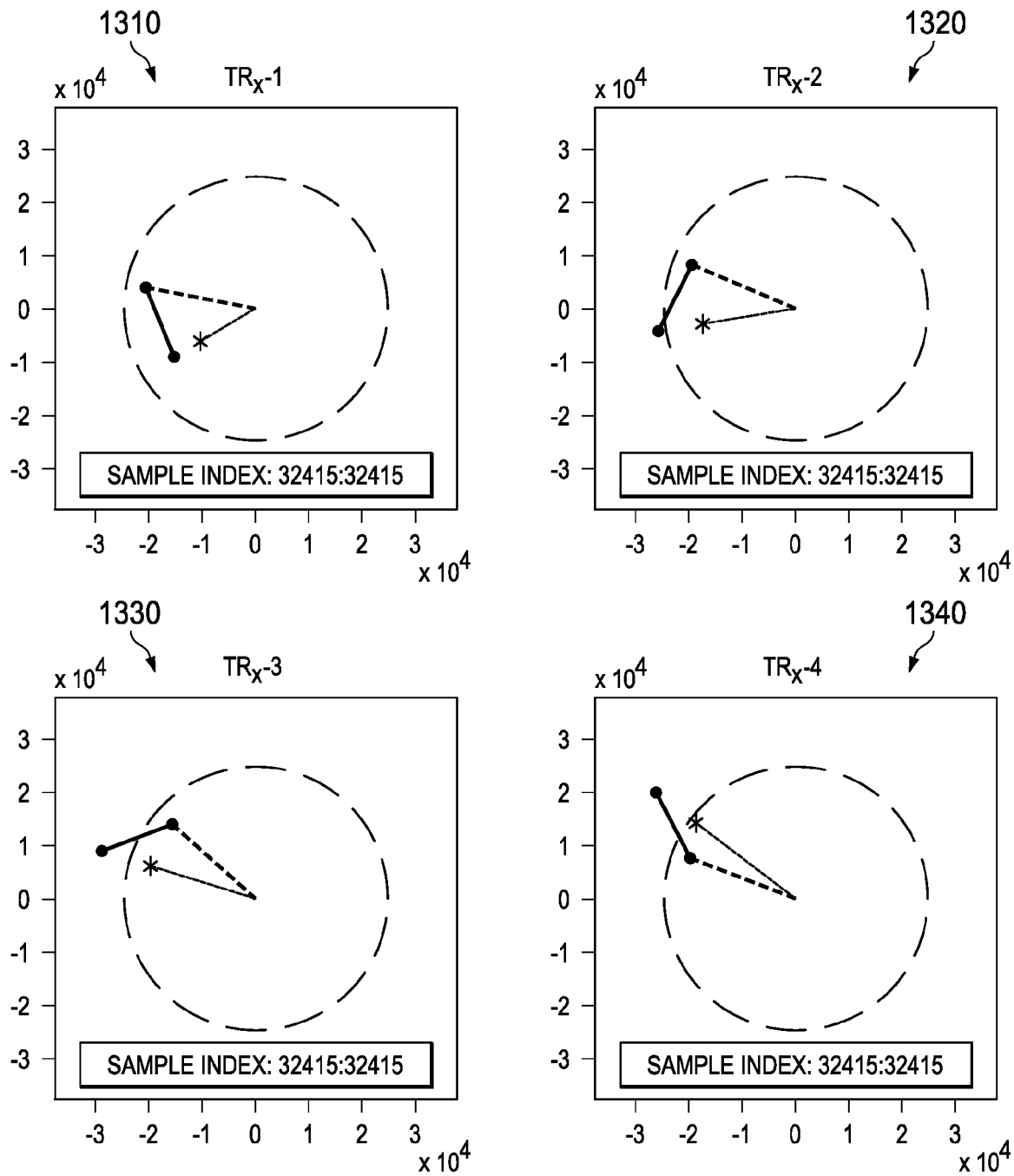
FIG. 13 illustrates graphs of clipped transmission signals resulting per-carrier CFR.
Figure 14:
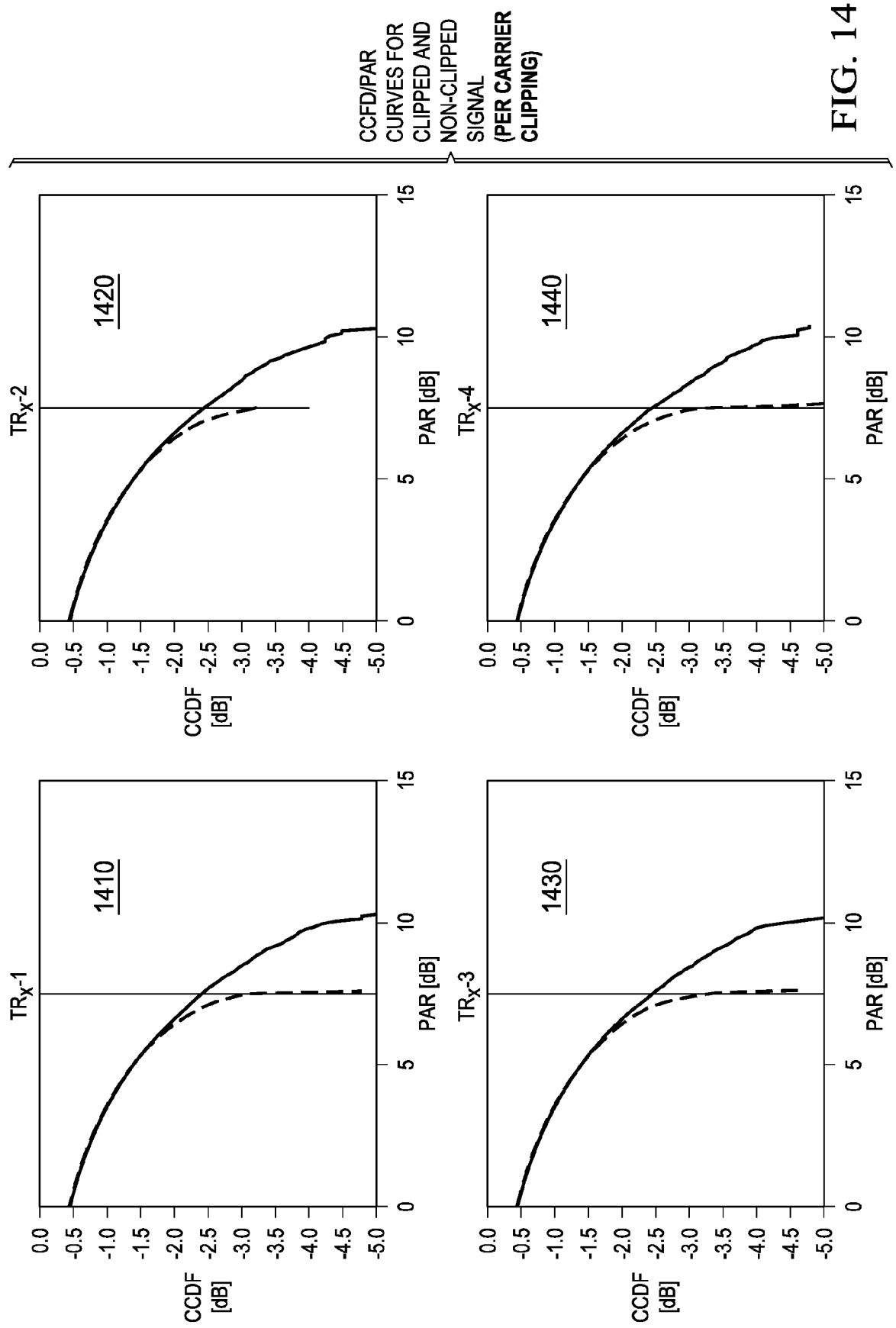
FIG. 14 illustrates a graph depicting simulation results.

FIG. 13 illustrates the clipped transmission signals 1310-1340 that result from per-carrier clipping as achieved by introducing the clipping noise signals 1201-1202 into the carrier-1 and carrier-2 by the multi-carrier multi-channel transmitter 600. As shown, each of the clipped transmission signals 1310-1340 have magnitudes that are less than the CFR threshold. Notably, the estimated unclipped transmission signal 1040 has the highest signal magnitude, and is therefore used to determine the clipping noise signal in the step 940. FIG. 14 illustrates complementary cumulative distribution functions charts 1410-1440 for clipped and unclipped signals generated during a CFR simulation. The CFR simulation was performed in accordance with aspects of this disclosure relating to per-carrier clipping, and the simulation results confirm that joint/per-carrier clipping is effective at reducing 99.99% of clipped signal magnitudes below the desired CFR threshold.

Figure 15:
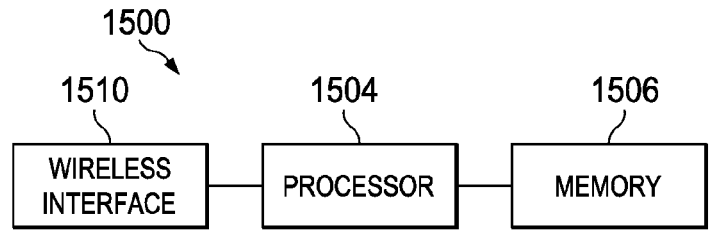
FIG. 15 illustrates a block diagram of an embodiment communications device.

FIG. 15 illustrates a block diagram of an embodiment of a communications device 1500. The communications device 1500 may include a processor 1504, a memory 1506, and a wireless interface 1510. The processor 1504 may be any component capable of performing computations and/or other processing related tasks, and the memory 1506 may be any component capable of storing programming and/or instructions for the processor 1504. The interface 1510 may be any component or collection of components that allows the communications device 1500 to communicate wirelessly.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for reducing a peak-to-average (PAR) ratio of a multi-carrier wireless signal, the method comprising:

generating a first carrier signal and a second carrier signal;

determining a first clip noise signal for the first carrier signal and a second clip noise signal for the second carrier signal;

introducing the first clip noise signal into the first carrier signal to obtain a first clipped carrier signal and the second clip noise signal into the second carrier signal to obtain a second clipped carrier signal;

modulating the first clipped carrier signal and the second clipped carrier signal to obtain a modulated carrier signal, wherein modulating the first clipped carrier signal comprises combining individual signal components of the first clipped carrier signal with individual signal components of the second clipped carrier signal to obtain a plurality of multi-carrier transmission signals; and transmitting the modulated carrier signal over a plurality of wireless interfaces, wherein each of the plurality of multi-carrier transmission signals are emitted over a different one of the plurality of wireless interfaces, and wherein determining the first clip noise signal and the second clip noise signal comprises:

estimating multi-carrier transmission signals prior to obtaining the modulated carrier signal, wherein each of the estimated multi-carrier transmission signals corresponds to a different one of the plurality of multi-carrier transmission signals in the modulated carrier signal; and determining the first clip noise signal and the second clip noise signal in accordance with the estimated multi-carrier transmission signals.

2. The method of claim 1 further comprising:

applying beamforming weights to the first clipped carrier signal and the second clipped carrier signal prior to modulating the first clipped carrier signal and the second clipped carrier signal, wherein the clipping noise is introduced into both the first carrier signal and the second carrier signal prior to application of the beamforming weights.

3. The method of claim 2, wherein a different set of beamforming weights is applied to the first clipped carrier signal than is applied to the second clipped carrier signal.

4. The method of claim 1, wherein determining the first clip noise and second clip noise in accordance with the estimated multi-carrier transmission signals comprises:

identifying one of the estimated multi-carrier transmission signals having a highest amplitude;

determining a difference between an amplitude of the estimated multi-carrier transmission signal having the highest amplitude and an amplitude threshold, the difference comprising a first component attributable to the first carrier signal and a second component attributable to the second carrier signal;

determining the first clip noise in accordance with the first component; and determining the second clip noise in accordance with the second component.

5. An apparatus for reducing a peak-to-average (PAR) ratio of a multi-carrier wireless signal, the apparatus comprising:

a processor; and a computer readable storage medium storing programming for execution by the processor, the programming including instructions to:

generate a first carrier signal and a second carrier signal;

determine a first clip noise signal for the first carrier signal and a second clip noise signal for the second carrier signal;

introduce the first clip noise signal into the first carrier signal to obtain a first clipped carrier signal and the second clip noise into the second carrier signal to obtain a second clipped carrier signal;

modulate the first clipped carrier signal and the second clipped carrier signal to obtain a modulated carrier signal, wherein the instructions to modulate the first clipped carrier signal includes instructions to combine individual signal components of the first clipped carrier signal with individual signal components of the second clipped carrier signal to obtain a plurality of multi-carrier transmission signals; and transmitting the modulated carrier signal over a plurality of wireless interfaces, wherein each of the plurality of multi-carrier transmission signals are emitted over a different one of the plurality of wireless interfaces, and wherein the instruction to determine the first clip noise signal and the second clip noise signal include instructions to:

estimate multi-carrier transmission signals prior to obtaining the modulated carrier signal, wherein each of the estimated multi-carrier transmission signals corresponds to a different one of the plurality of multi-carrier transmission signals in the modulated carrier signal; and determine the first clip noise signal and the second clip noise signal in accordance with the estimated multi-carrier transmission signals.

6. The apparatus of claim 5, wherein the clipping noise is introduced into the first carrier signal and the second carrier signal prior to the modulating step.

7. The apparatus of claim 5, wherein the programming further includes instructions to:

apply beamforming weights to the first clipped carrier signal and the second clipped carrier signal prior to modulating the first clipped carrier signal and the second clipped carrier signal, wherein the clipping noise is introduced into the first carrier signal and the second carrier signal prior to application of the beamforming weights.

8. The apparatus of claim 5, wherein a different set of beamforming weights are applied to the first clipped carrier signal than are applied to the second clipped carrier signal.

9. The apparatus of claim 5, wherein the instructions to determine the first clip noise and second clip noise in accordance with the estimated multi-carrier transmission signals includes instructions to:

identify one of the estimated multi-carrier transmission signals having a highest amplitude;

determine a difference between an amplitude of the estimated multi-carrier transmission signal having the highest amplitude and an amplitude threshold, the difference comprising a first component attributable to the first carrier signal and a second component attributable to the second carrier signal;

determine the first clip noise in accordance with the first component; and determine the second clip noise in accordance with the second component.

10. An apparatus comprising:

an antenna array; and a transmitter circuit coupled to the antenna, the transmitter circuit configured to:

generate a first carrier signal and a second carrier signal;

determine a first clip noise signal for the first carrier signal and a second clip noise signal for the second carrier signal;

introduce the first clip noise signal into the first carrier signal to obtain a first clipped carrier signal and the second clip noise into the second carrier signal to obtain a second clipped carrier signal;

modulate the first clipped carrier signal and the second clipped carrier signal to obtain a modulated carrier signal, wherein the transmitter circuit modulates the first clipped carrier signal by combining individual signal components of the first clipped carrier signal with individual signal components of the second clipped carrier signal to obtain a plurality of multi-carrier transmission signals; and transmit the modulated carrier signal over a plurality of wireless interfaces, wherein each of the plurality of multi-carrier transmission signals are emitted over a different one of the plurality of wireless interfaces, and wherein the transmitter circuit determines the first clip noise signal and the second clip noise signal by:

estimating multi-carrier transmission signals prior to obtaining the modulated carrier signal, wherein each of the estimated multi-carrier transmission signals corresponds to a different one of the plurality of multi-carrier transmission signals in the modulated carrier signal; and determining the first clip noise signal and the second clip noise signal in accordance with the estimated multi-carrier transmission signals.

11. The apparatus of claim 10, wherein the transmitter circuit is at least partially constructed using field programmable gate arrays.

12. The apparatus of claim 10, wherein the transmitter circuit is at least partially constructed using application-specific integrated circuits (ASICs).

13. The apparatus of claim 10, wherein the transmitter circuit is configured to determine the first clip noise and second clip noise in accordance with the estimated multi-carrier transmission signals by:

identifying one of the estimated multi-carrier transmission signals having a highest amplitude;

determining a difference between an amplitude of the estimated multi-carrier transmission signal having the highest amplitude and an amplitude threshold, the difference comprising a first component attributable to the first carrier signal and a second component attributable to the second carrier signal;

determining the first clip noise in accordance with the first component; and determining the second clip noise in accordance with the second component.

* * * * *

UNITED STATES PATENT AND TRADEMARK OFFICE
CERTIFICATE OF CORRECTION

PATENT NO. : 9,065,605 B2
APPLICATION NO. : 13/802028
DATED : June 23, 2015
INVENTOR(S) : Leonard Piazzi et al.

It is certified that error appears in the above-identified patent and that said Letters Patent is hereby corrected as shown below:

In the Claims
In Col. 8, line 41, claim 8, delete "claim 5," and insert --claim 7,--.

Signed and Sealed this
Tenth Day of November, 2015

Michelle K. Lee
*Director of the United States Patent and Trademark Office*